United States Patent [19]

Kobayashi et al.

[11] Patent Number: 5,241,032
[45] Date of Patent: Aug. 31, 1993

[54] METHOD FOR THE PREPARATION OF ORGANOPOLYSILOXANES

[75] Inventors: Kazuo Kobayashi; Yokichi Yamamoto, both of Ichihara, Japan

[73] Assignee: Dow Corning Toray Silicone Co., Ltd., Tokyo, Japan

[21] Appl. No.: 837,230

[22] Filed: Feb. 18, 1992

[30] Foreign Application Priority Data

Feb. 22, 1991 [JP] Japan ............................ 3-050695

[51] Int. Cl.⁵ .............................................. C08G 77/06
[52] U.S. Cl. ..................................... 528/12; 528/18; 528/21; 528/23; 556/467
[58] Field of Search ................. 528/23, 21, 12, 18; 556/467

[56] References Cited

U.S. PATENT DOCUMENTS 4,482,670 11/1984 Saam et al. ............................ 528/23
4,722,987 2/1988 Ikeno ..................................... 528/23

Primary Examiner—Melvyn I. Marquis
Attorney, Agent, or Firm—Alexander Weitz

[57] ABSTRACT

A method for the preparation of an organopolysiloxane comprising polymerizing at least one organosiloxane in the presence of a strong acid catalyst, and subsequently neutralizing said catalyst by the addition of a neutralizing agent, is disclosed wherein the neutralizing agent is ammonia gas. The invention leads to a substantial abbreviation in the neutralization time and, because it affords a nearly complete neutralization of the acid catalyst, the method provides an organopolysiloxane which has excellent heat resistance.

8 Claims, No Drawings

METHOD FOR THE PREPARATION OF ORGANOPOLYSILOXANES

FIELD OF THE INVENTION

The present invention relates to a method for the preparation of organopolysiloxanes. More particularly, the present invention relates to a method of organopolysiloxane preparation in which the strong acid catalyst employed for organosiloxane polymerization is almost completely neutralized with ammonia gas.

BACKGROUND OF THE INVENTION

Organopolysiloxanes can be prepared by the polymerization of low-molecular-weight organosiloxanes and molecular chain end-blocking agent (added to regulate the degree of polymerization) under strong acid or strong base catalysis. This polymerization is followed by neutralization of the catalyst. The preparation of organopolysiloxanes under strong acid catalysis is typically run as follows.

An organosiloxane is first polymerized in the presence of a strong acid catalyst. After polymerization the organopolysiloxane is washed with water, and the strong acid catalyst is then neutralized by the addition of a solid neutralizing agent such as sodium carbonate, sodium bicarbonate. calcium carbonate, magnesium carbonate, or ammonium carbonate. The excess neutralizing agent and the neutralization salt(s) produced by the neutralization reaction(s) are filtered off, and the organopolysiloxane product is recovered by heating the filtrate in vacuo in order to remove low-boiling components such as unreacted organosiloxane.

However, because this neutralization reaction is run in a heterogeneous system, the neutralization times are exceedingly long. Moreover, because a nearly complete neutralization of the strong acid catalyst cannot be achieved, another problem here is that the organopolysiloxane yield is reduced by a depolymerization which occurs when the organopolysiloxane is heated in vacuo after neutralization. An additional problem with organopolysiloxane produced by this method is that it has an impaired heat resistance due to the presence of residual unneutralized strong acid catalyst.

In another vein, the heat resistance of organopolysiloxanes obtained from such polymerization is also impaired by the presence of terminal silanol groups rather than the molecular chain end-blocking group added for the purpose of regulating the degree of polymerization.

In order to solve the problems described above. investigations were conducted into various organopolysiloxane preparative methods, for example, (a) organosiloxane polymerization under strong acid catalysis followed by the addition of aqueous ammonia to the system, and (b) organosiloxane polymerization under strong acid catalysis followed by addition to the system of water and the organosilicon compound $(R^1_3Si)_2NH$ or $R^1_3SiNHR^2$ wherein $R^1$ and $R^2$ are each a single species or multiple species of substituted or unsubstituted monovalent hydrocarbon group (refer to Japanese Patent Application Laid Open Number 62-41228 which is equivalent to U.S. Pat. No. 4,722.987).

A drawback to the first method is the partial gelation of the organopolysiloxane product when this method is applied to the preparation of SiH containing organopolysiloxane. While the second method does lead to depletion of the silanol in the organopolysiloxane product, it requires the use of expensive silazane or silylamine. Because the second method also requires the addition of water in an amount approximately equimolar with the silazane or silylamine, another problem with this particular method is the gelation of a portion of the organopolysiloxane product when this method is applied to the preparation of SiH-containing organopolysiloxane. Moreover, the aqueous ammonia generated by silazane (or silylamine) hydrolysis in the second method causes a partial cleavage of the organopolysiloxane main chain. The resulting silanol groups react with the introduced organosilicon compound to produce a molecular chain end group concentration which is higher than the theoretical molecular chain end group concentration. This causes the reproducibility of the degree of polymerization to be poor for the organopolysiloxane product.

SUMMARY OF THE INVENTION

The present inventors carried out extensive investigations in order to solve the problems described above, and the present invention was developed as a result.

The first object of the present invention is the introduction of a method for the preparation of an organopolysiloxane polymer or copolymer in which the strong acid catalyst employed for organosiloxane polymerization is almost completely neutralized with ammonia gas. The second object of the present invention is the introduction of a method for the preparation of the organopolysiloxane in which said catalyst is almost completely neutralized and in which the silanol level in the organopolysiloxane product is diminished.

DETAILED DESCRIPTION OF THE INVENTION

The first object of the present invention is achieved by a method for the preparation of organopolysiloxanes which is characterized by the addition of ammonia gas to the system resulting from polymerization of organosiloxanes under strong acid catalysis.

In a first preparative method according to the present invention, an organosiloxane is first polymerized under strong acid catalysis. The following components are stirred together while heating in order to run this polymerization reaction: low-molecular weight cyclic or straight-chain organosiloxanes, a strong acid catalyst and molecular chain end blocker added for the purpose of regulating the degree of polymerization, the latter being exemplified by hexamethyldisiloxane and tetramethyldivinyldisiloxane. No particular restrictions are placed on the polymerization conditions. The strong acid catalyst used here is exemplified by sulfuric acid, hydrochloric acid, nitric acid, trifluoromethanesulfonic acid and the silyl esters of trifluoromethanesulfonic acid, such as trimethylsilyl trifluoromethanesulfonate and triethylsilyl trifluoromethanesulfonate. Trifluoromethanesulfonic acid and the silyl esters of trifluoromethanesulfonic are particularly preferred because they are very reactive and can be used in lower concentrations than other strong acid catalysts. The strong acid catalyst should be added at 500 to 1,000 ppm (by weight) based on starting organosiloxane. A solvent may be used in order to reduce the viscosity of the polymerization reaction system.

After polymerization of the organosiloxane in the presence of the strong acid catalyst is accomplished, ammonia gas is introduced into the system in order to neutralize the strong acid catalyst. The ammonia gas should be introduced so as to provide a 1.5-fold to 5-fold excess based on the equivalents of the strong acid catalyst employed. The ammonia gas can be introduced into the polymerization reaction system by such techniques as bubbling, or the like. No particular limitations are placed on the temperature in the polymerization reaction system when the ammonia gas is introduced. In fact, neutralization can be conducted immediately after polymerization by the introduction of ammonia gas at the polymerization reaction temperature. After completion of the neutralization reaction, the organopolysiloxane is heated in vacuo in order to remove lowboiling components such as unreacted organosiloxane and any solvent which may have been added to the polymerization reaction system. After completion of neutralization, the ammonium salt produced by the neutralization reaction may be filtered off as desired, but heating the organopolysiloxane in vacuo without filtration of the ammonium salt produced by the neutralization reaction is particularly preferred. This serves to deplete the silanol in the organopolysiloxane through condensation and to abbreviate the manufacturing process. With regard to heating the organopolysiloxane in vacuo after completion of the neutralization reaction. conditions are preferred which will accelerate the silanol condensation reaction. Specifically, vacuums below 5 mm Hg and temperatures of at least 150° C. are preferred. Then, assuming that the ammonium salt is still present in the resulting organopolysiloxane, the organopolysiloxane product is recovered by filtration.

The second object of the present invention can be achieved by a method for the preparation of an organopolysiloxane which is characterized by the addition of ammonia gas and the addition of the organosilicon compound $R_3SiCl$, in which R is a single species or multiple species independently selected from hydrogen, monovalent hydrocarbon groups or substituted monovalent hydrocarbon groups, to the system obtained from the polymerization of organosiloxanes under strong acid catalysis.

The method for polymerizing the organosiloxane under strong acid catalysis and the method for neutralizing the strong acid catalyst with ammonia gas are the same in this second preparative method as in the preceding discussion. In this second preparative method according to the present invention, an organosiloxane is again polymerized in the presence of a strong acid catalyst, and ammonia gas and the organosilicon compound $R_3SiCl$ are added to the system after the polymerization step. In the preceding formula, the groups R are independently selected from hydrogen or substituted (or unsubstituted) monovalent hydrocarbon groups. Specific examples here are the hydrogen atom; alkyl groups, such as methyl, ethyl and propyl; aryl groups, such as phenyl and tolyl; alkenyl groups, such as vinyl, allyl and hexenyl; the choromethyl group and the perfluoropropyl group. While no specific limitations are placed on the amount of this organosilicon compound to be used, it should be added in excess relative to the molar content of the silanol groups produced in the polymerization step. The organosilicon compound under consideration reacts with, and accordingly depletes, the silanol groups in the organopolysiloxane. After the completion of neutralization, the organopolysiloxane can be recovered by the same work up as described above.

EXAMPLES

The present invention is explained in greater detail below with reference to illustrative examples. The organopolysiloxane viscosity reported in the examples is the value measured at 25° C. In order to calculate the nonvolatile fraction, 5 grams (g) of the organopolysiloxane in an aluminum dish was heated in an oven at 150° C. for 3 hours and the change in the weight of the organopolysiloxane measured. The extent of neutralization was evaluated through the organopolysiloxane's acid value, which is a characteristic that originates from the residual unneutralized strong acid catalyst. Finally, the organopolysiloxane s heat resistance was evaluated by its viscosity change after standing for 96 hours at 200° C. (viscosity change due to heating).

EXAMPLE 1

One half gram of trifluoromethanesulfonic acid and 0.1 g of water were stirred into an organosiloxane mixture consisting of 926 g of octamethylcyclotetrasiloxane and 14 g of trimethylsilylterminated methylhydrogenpolysiloxane (silicon-bonded hydrogen concentration in this mixture $=0.095$ weight %). This was followed by heating and polymerization at 65° C. over a period of 3 hours. Ammonia gas was then bubbled into the reaction system for 30 minutes so as to supply 2 moles of ammonia gas per 1 mole trifluoromethanesulfonic acid. After the completion of the neutralization reaction, the lowboiling components were removed at 170° C./1 mm Hg over 3 hours. After cooling, the ammonium trifluoromethanesulfonate produced by the neutralization reaction was filtered off to afford the methylhydrogensiloxanedimethylsiloxane copolymer. The physical properties of this methylhydrogensiloxane-dimethylsiloxane copolymer product are reported in Table 1.

For comparison, a methylhydrogensiloxanedimethylsiloxane copolymer was prepared as in Example 1, but in this case the neutralization reaction of Example 1 was run by adding 15 moles of sodium bicarbonate per 1 mole of trifluoromethanesulfonic acid and by reacting for 5 hours at room temperature. In addition, methylhydrogensiloxane-dimethylsiloxane copolymer was again prepared as in Example 1, but in this case the neutralization reaction of Example 1 was run by reacting aqueous ammonia (8 moles ammonia per 1 mole trifluoromethanesulfonic acid) for 1 hour at room temperature. In yet another experiment, methylhydrogensiloxane-dimethylsiloxane copolymer was again prepared as in Example 1, but in this case the neutralization reaction of Example 1 was run by adding 8 moles ammonium bicarbonate and 8 moles water per 1 mole trifluoromethanesulfonic acid and by reacting for 5 hours at room temperature. The physical properties of these methylhydrogensiloxanedimethylsiloxane copolymer products are also reported in Table 1. In the case of the aqueous ammonia, part of the methylhydrogensiloxane-dimethylsiloxane copolymer product was gelled.

TABLE 1

| neutralizing agent | present invention ammonia gas | comparison examples | | |
|---|---|---|---|---|
| | | NaHCO$_3$ | aqueous ammonia | NH$_4$HCO$_3$ |
| viscosity (centistokes) | 288 | 315 | 328 | 320 |
| nonvolatile fraction (weight %) | 99 | 98 | 98 | 98 |
| acid value | 0.0005 | 0.01 | 0.005 | 0.01 |

TABLE 1-continued

|  | present invention | comparison examples | | |
|---|---|---|---|---|
| neutralizing agent | ammonia gas | NaHCO$_3$ | aqueous ammonia | NH$_4$HCO$_3$ |
| (KOH mg/g) SiH content (weight %) | 0.095 | 0.092 | 0.092 | 0.093 |
| yield (%) | 87 | 80 | 83 | 85 |

TABLE 2

|  | present invention | | comparison examples | |
|---|---|---|---|---|
| neutralizing agent | ammonia gas | ammonia gas | Na$_2$CO$_3$ | hexamethyl-disilazane |
| additive | none | (CH$_3$)$_3$SiCl | none | water |
| viscosity (centistokes) | 10800 | 9300 | 8700 | 9200 |
| yield (%) | 87 | 87 | 83 | 87 |
| silanol concentration (ppm) | 17 | 10 | 75 | 10 |
| viscosity change due to heating (%) | −7 | −12 | −52 | −18 |

EXAMPLE 2

There was combined, with stirring, 996.2 g of octamethylcyclotetrasiloxane (water content =110 ppm), 3.8 g of hexamethyldisiloxane, 1.0 g of trifluoromethanesulfonic acid and 0.1 g of water. This was followed by heating and polymerization over 3 hours at 70° C. Ammonia gas was subsequently bubbled in for 8 minutes at a flow rate of 100 cc/minute, and this was followed by standing for 10 minutes. After completion of the neutralization reaction, the low-boiling components were removed at 170° C./1 mm Hg over 5 hours. After cooling, dimethylpolysiloxane was recovered by filtration of the ammonium trifluoromethanesulfonate produced by the neutralization reaction. The physical properties of this dimethylpolysiloxane product are reported in Table 2.

In another experiment, after polymerization as in Example 2, 1.5 g of trimethylchlorosilane was added to the system at room temperature with stirring for 15 minutes. After this, the dimethylpolysiloxane was recovered as in Example 2, with the exception that the ammonia gas was bubbled in at 100 cc/minute for 15 minutes. The physical properties of the resulting dimethylpolysiloxane are also reported in Table 2.

In a comparison experiment, the neutralization reaction of Example 2 was run by adding 10 g sodium carbonate as neutralizing agent and reacting for 12 hours at room temperature. The sodium trifluoromethanesulfonate product and excess sodium carbonate were filtered off and the dimethylpolysiloxane was recovered by removing the low-boiling components by heating at 170° C./1 mm Hg. In another comparison experiment, the neutralization reaction of Example 2 was run by the addition at room temperature of 0.24 g water and 1.4 g of hexamethyldisilazane as neutralizing agent and reacting for 2 hours. The low-boiling components were then removed by heating for 5 hours at 170° C./1 mm Hg. The dimethylpolysiloxane was recovered by filtering off the ammonium trifluoromethanesulfonate produced by the neutralization reaction. The physical properties of these dimethylpolysiloxanes are also reported in Table 2.

EXAMPLE 3

There was combined, with stirring, 975 g of octamethylcyclotetrasiloxane, 25 g of tetramethyldivinyldisiloxane, 1.0 g of trifluoromethanesulfonic acid and 0.1 g water. This was followed by heating and polymerization at 70° C. over 3 hours. Ammonia gas was then bubbled in for 8 minutes at a flow rate of 100 cc/minute followed by standing for 10 minutes. After the completion of neutralization, the low boiling components were removed by heating for 5 hours at 170° C./1 mm Hg. The ammonium trifluoromethanesulfonate produced by the neutralization reaction was subsequently removed by filtration to afford a transparent, dimethylvinylsiloxy-terminated dimethylpolysiloxane in a yield of 87%. This dimethylpolysiloxane product had a viscosity of 2,100 centistokes and a silanol concentration of 11 ppm.

That which is claimed is:

1. In a method for the preparation of an organopolysiloxane comprising polymerizing at least one organosiloxane in the presence of a strong acid catalyst and subsequently neutralizing said catalyst by the addition of a neutralizing agent, the improvement comprising using ammonia gas as said neutralizing agent, wherein said organopolysiloxane is an SiH-containing organopolysiloxane.

2. The method according to claim 1, wherein an organosilicon compound having the formula R$_3$SiCl is also added to the organopolysiloxane subsequent to said polymerization. R being independently selected from the group consisting of hydrogen. substituted monovalent hydrocarbon groups and unsubstituted monovalent hydrocarbon groups.

3. The method according to claim 2, wherein R is selected from the group consisting of alkyl radicals having 1-3 carbon atoms, a phenyl radical and a vinyl radical.

4. The method according to claim 1, wherein said strong acid catalyst is selected from the group consisting of trifluoromethanesulfonic acid and a silyl ester of trifluoromethanesulfonic acid.

5. The method according to claim 1, wherein said organopolysiloxane is polydimethylsiloxane.

6. The method according to claim 2, wherein said organopolysiloxane is polydimethylsiloxane.

7. The method according to claim 3, wherein said organopolysiloxane is polydimethylsiloxane.

8. The method according to claim 4, wherein said organopolysiloxane is polydimethylsiloxane.

* * * * *